(12) United States Patent
Chin

(10) Patent No.: US 12,542,849 B2
(45) Date of Patent: Feb. 3, 2026

(54) ENABLING GROUPS OF USERS TO BE CONNECTED 1-ON-1

(71) Applicant: Crosstalk Technologies, PBC, New York, NY (US)

(72) Inventor: Christopher Lee Chin, New York, NY (US)

(73) Assignee: Crosstalk Technologies, PBC, New York, NY (US)

(*) Notice: Subject to any disclaimer, the term of this patent is extended or adjusted under 35 U.S.C. 154(b) by 0 days.

(21) Appl. No.: 19/193,591

(22) Filed: Apr. 29, 2025

(65) Prior Publication Data
US 2025/0343855 A1    Nov. 6, 2025

Related U.S. Application Data

(60) Provisional application No. 63/643,207, filed on May 6, 2024.

(51) Int. Cl.
*H04M 3/00* (2024.01)
*G06F 40/30* (2020.01)
(Continued)

(52) U.S. Cl.
CPC ............ *H04M 3/42* (2013.01); *G06F 40/30* (2020.01); *G06Q 50/01* (2013.01)

(58) Field of Classification Search
CPC ... H04L 65/1069; H04L 67/306; H04L 69/24; H04L 65/752; H04L 67/12; H04L 65/403; H04L 63/18; H04L 65/1104; H04L 67/104; H04L 67/14; H04L 67/141; H04L 65/401; H04L 51/04; H04L 65/1096;
(Continued)

(56) References Cited

U.S. PATENT DOCUMENTS

| 7,454,464 B2 | 11/2008 | Puthenkulam et al. |
| 7,765,484 B2 | 7/2010 | Roskind |

(Continued)

FOREIGN PATENT DOCUMENTS

EP    3846455 A1    7/2021

OTHER PUBLICATIONS

PCT Search Report and Written Opinion of PCT/US2025/027787, dated Sep. 9, 2025, 10 pages.

*Primary Examiner* — Kharye Pope
(74) *Attorney, Agent, or Firm* — David J. Thibodeau, Jr.; VLP Law Group LLP

(57) ABSTRACT

A system and method for establishing seamless 1-on-1 conversations by telephone or video between users in a social graph comprising group membership and direct connections between users. The system and method obviate the need for users to dial out to other users to initiate conversations, which can be frustrating when their calls go unanswered. Instead, the system makes near-simultaneous outbound calls to a plurality of users. Then, for users who answer the outbound calls, the system selects pairs of users and bridges their calls such that each pair of users is then connected in a 1-on-1 call. As a result, a user only needs to answer a call, and they are guaranteed to speak with someone. The selected pairings of users are optimized based on the social graph, user attributes and preferences, and call history, with the goal of promoting quality conversations and feelings of social connectedness.

19 Claims, 10 Drawing Sheets

(51) Int. Cl.
*G06Q 50/00* (2024.01)
*H04L 12/66* (2006.01)
*H04M 3/42* (2006.01)
*H04M 5/00* (2006.01)

(58) Field of Classification Search
CPC ............ H04L 65/1093; H04L 12/1822; H04L 63/104; H04L 12/1813; H04M 2250/52; H04M 1/6066; H04M 1/72433; H04M 3/567; H04M 3/5183; H04M 3/5191; H04M 3/5158; H04M 3/5175; H04M 2201/40; H04M 3/42221; H04M 3/2218; H04M 3/523; H04M 3/5231; H04M 3/51; H04M 2203/404; H04M 3/5233; H04M 3/5235; H04M 3/56; H04M 3/58; H04M 2207/206; H04M 2203/2027; H04M 3/42068
See application file for complete search history.

(56) References Cited

U.S. PATENT DOCUMENTS

| | | | |
|---|---|---|---|
| 7,822,739 B2 | 10/2010 | Srikanth et al. | |
| 7,881,235 B1* | 2/2011 | Arthur | H04L 12/1818 709/227 |
| 8,055,788 B1 | 11/2011 | Chan et al. | |
| 8,694,633 B2 | 4/2014 | Mansfield et al. | |
| 9,065,869 B2 | 6/2015 | Rajakarunanayake et al. | |
| 9,294,428 B2 | 3/2016 | Nordstrom et al. | |
| 9,363,356 B2 | 6/2016 | Colletti | |
| 10,740,809 B2 | 8/2020 | Goodwin et al. | |
| 11,100,548 B1* | 8/2021 | Gray | H04M 3/5183 |
| 11,303,599 B2 | 4/2022 | Thomas et al. | |
| 2002/0090964 A1* | 7/2002 | Harder | H04M 3/5158 455/466 |
| 2006/0101098 A1* | 5/2006 | Morgan | H04M 7/006 |
| 2009/0180596 A1 | 7/2009 | Reynolds et al. | |
| 2009/0299963 A1* | 12/2009 | Pippuri | H04M 1/2746 |
| 2011/0116618 A1* | 5/2011 | Zyarko | H04M 3/5158 379/266.07 |
| 2012/0173269 A1 | 7/2012 | Omidi | |
| 2012/0284341 A1* | 11/2012 | Masood | G06Q 30/02 709/205 |
| 2014/0247933 A1* | 9/2014 | Soundar | H04M 3/58 379/211.02 |
| 2015/0281371 A1 | 10/2015 | Bacon | |
| 2015/0281452 A1* | 10/2015 | Bohlin | H04M 3/51 379/266.07 |
| 2016/0117355 A1* | 4/2016 | Krishnamurthy | H04L 67/535 707/749 |
| 2024/0205334 A1* | 6/2024 | Budilovsky | H04M 3/5175 |
| 2024/0430216 A1* | 12/2024 | Abraham | H04L 51/04 |
| 2025/0023913 A1* | 1/2025 | Roytman | H04L 41/16 |

* cited by examiner

ENABLING GROUPS OF USERS TO BE CONNECTED 1-ON-1

CROSS REFERENCE TO RELATED APPLICATIONS

This application claims the benefit of U.S. Provisional Application Seral No. 63/643,207 filed May 6, 2024, the entire contents of which are hereby incorporated by reference.

BACKGROUND

The system and methods described herein relate to providing greater accessibility and efficiency in facilitating social connections among individuals in groups.

More particularly, the need is exemplified by peer support groups such as Alcoholics Anonymous, which have been found to be highly effective in driving positive behavioral changes and mental wellbeing due to their emphasis on promoting strong social bonds between members. In addition to fostering social connection through group meetings, members are also encouraged to cultivate one-on-one ("1-on-1") social connection by each member calling another member 1-on-1 on a regular basis via telephone, typically daily.

SUMMARY

Despite the proven benefits, consistently following through on these daily 1-on-1 phone calls is challenging and leads to a high dropout rate from such groups. Logistical hurdles such as schedule conflicts are compounded by psychological barriers. Notably, a survey found that 81% of Millennials experience anxiety when trying to make phone calls, often due to fear of feeling rejected if their call goes unanswered. These hurdles ultimately lead to the 1-on-1 calls not occurring, resulting in further social isolation.

The systems and methods described herein overcome these challenges by automatically scheduling and establishing 1-to-1 connections, guaranteeing that users will be able to speak with a supportive peer on a scheduled basis, such as every single day.

In preferred embodiments, a system or method establishes 1-to-1 connections between users that are members of one or more groups in a social network graph. The system makes outbound calls to users nearly simultaneously. For users that answer the outbound calls, the system selects pairings of the users, and the calls for each pair are bridged together such that each pair of users is then speaking 1-on-1. It may be advantageous, before making the outbound calls, to send messages to each user that indicates a time when the user should expect to be called. The outbound calls may be made simultaneously to some or all of the users and sequenced over time. The time distribution of the outbound calls and pairs of users selected may depend on a graph that represents social connection between users and other attributes. The users themselves may opt in to groupings represented by the social graph and otherwise add attributes about themselves that allows the system to select better pairings of users for good conversations.

DETAILED DESCRIPTION OF PREFERRED EMBODIMENTS

Figure 1:
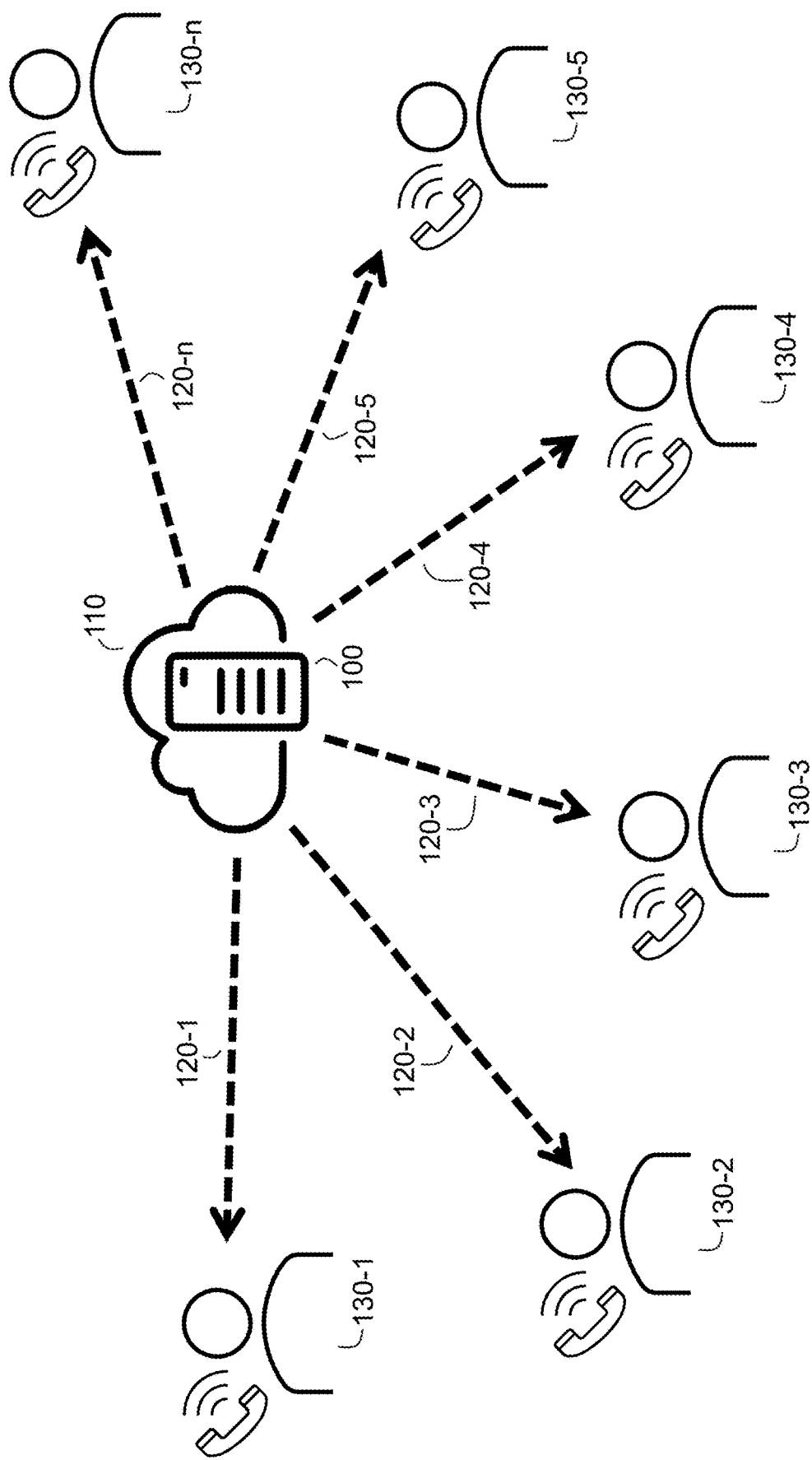
FIG. 1 shows how outbound calls may be made to users nearly simultaneously.

Referring now to FIG. 1, in preferred embodiments, a system 100 makes use of telephony infrastructure 110 to initiate automated outbound phone calls 120-1, 120-2, 120-3, 120-4, 120-5, ..., 120-$n$ (collectively, the outbound calls 120) to each user in a set of users 130-1, 130-2, 130-3, 130-4, 130-5, ..., 130-$n$ (collectively, the users 130). The outbound calls 120 are preferably made to users 130 in rapid succession, essentially as close to simultaneously as possible.

As will be described in more detail later, the system 100 may be implemented in any convenient data processing hardware such as a cloud computing service, and the telephony infrastructure 110 may be any a public or private telephone network, cellular network, or other network capable of conducting phone calls or video calls.

Figure 2:
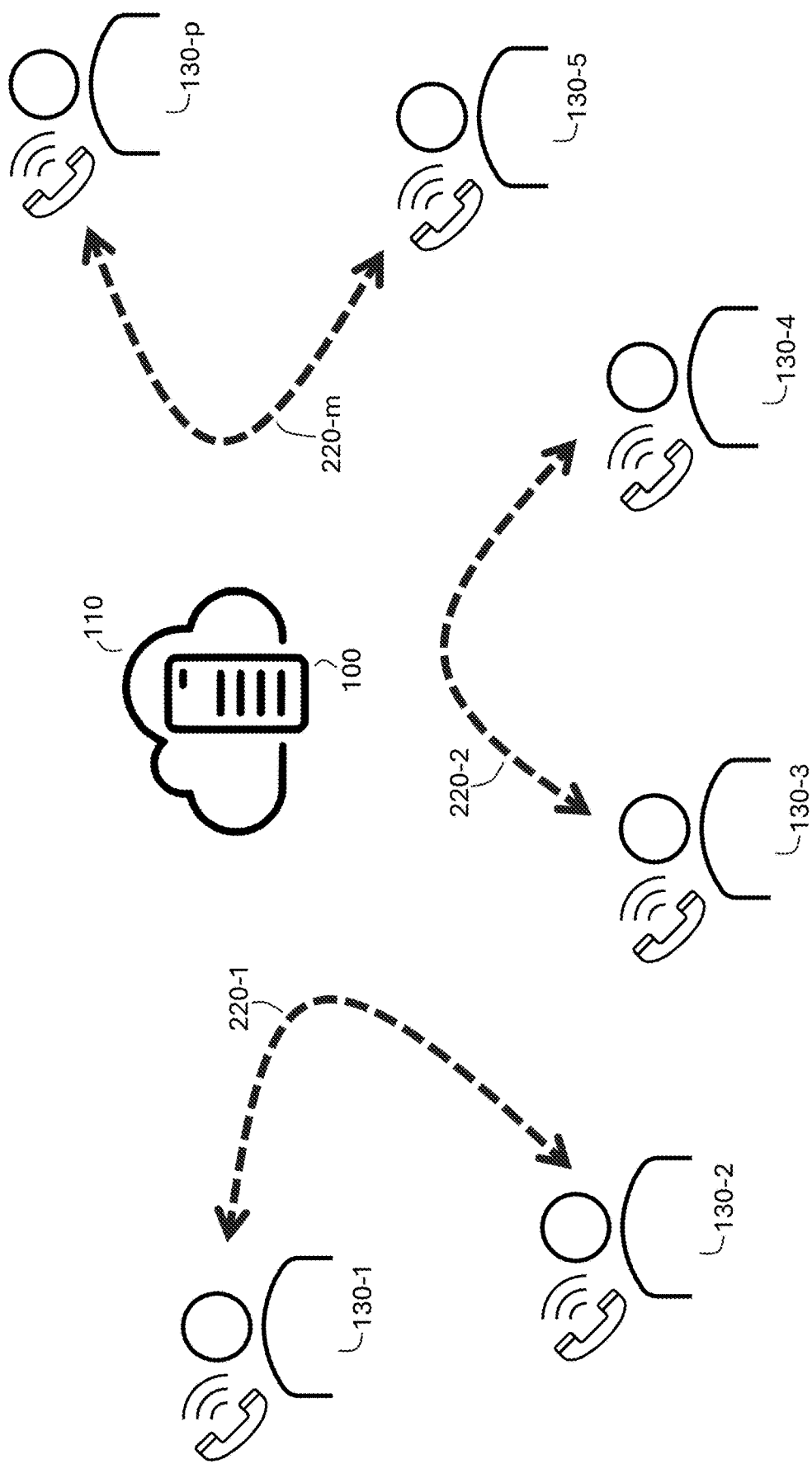
FIG. 2 shows how users who answer the calls are then paired and placed into 1-on-1 calls.

Then, as shown in FIG. 2, the system 100 notes which of the users 130-1, 130-2, ..., 130-$p$ actually answered its automated outbound calls 120 from the previous step. These users will be a subset of all users 130. The system 100 then selects pairs of these users and bridges the calls for each pair, thereby establish 1-on-1 calls 220-1, 220-2, ..., 220-$m$ between each pair of users. The system 100 may in some embodiments, select these pairs of users based on how the users are placed in a previously defined social graph and/or other optimizing heuristics on data available to the system 100.

A set of three users may be selected and bridged into a 3-way call if there are an odd number of users 130 who answered the outbound calls.

In some embodiments, size-N subsets of users may be selected and bridged together (e.g., creating 3-way, 4-way, 5-way, etc., calls) instead of pairs.

The 1-on-1 connecting calls 220 are made by first placing a user 130-1 on hold in order to wait for more users to answer the outbound calls. Once the system 100 identifies a suitable user 130-2 who answers their outbound call, the calls for the pair of users 130-1 and 130-2 will then be bridged together to establish the 1-on-1 call 220-1 so that those two users may then converse with each other.

If a user on hold is determined to be a lone user—i.e., there are no suitable users to pair with them because all the other users who could answer the outbound calls are not connected to that user-then the system 100 will terminate the call with the lone user after stating an error message to the user. In some embodiments, instead of terminating the call with the lone user, the system may make additional outbound calls to users, e.g., those suitable to be paired with anyone, so that the lone user is guaranteed to have someone to speak with.

Figure 3:
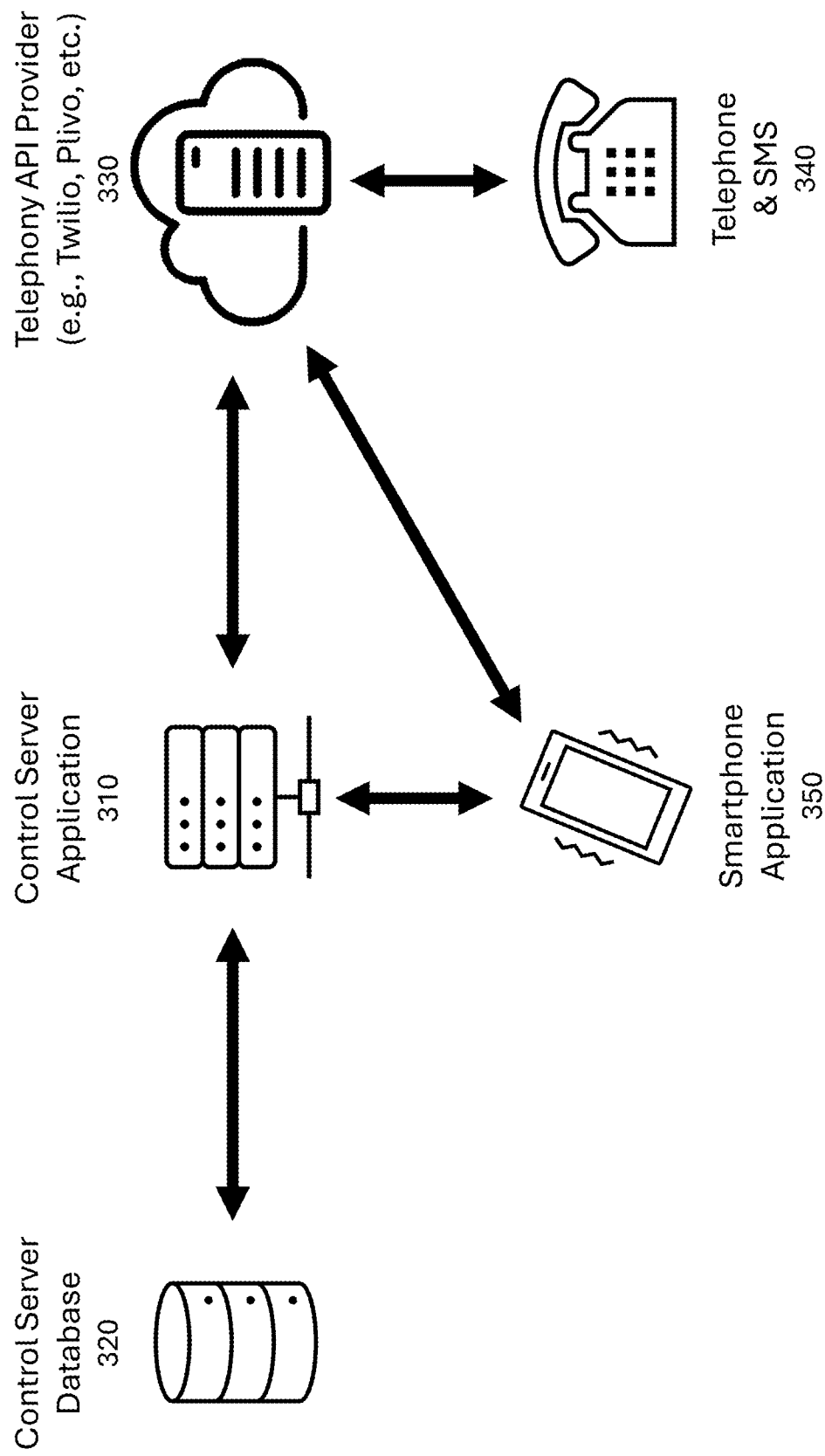
FIG. 3 is a diagram of an example system environment.

FIG. 3 is a more detailed diagram of an example system 100 environment implementation. The components consist of a control server application 310, a database 320, a telephony API provider 330, user phones that can receive telephone calls and SMS messages 340, and, in some embodiments, a smartphone application 350.

The telephony API provider 330 (e.g., Twilio, Plivo, Microsoft Azure Communications Services, etc.) enables the system 100 to programmatically make outbound calls to users and send/receive text messages with users via a telephone, cellular, or other network.

The database 320 stores application configuration, state data, historical call information, and user information, including the social graph of the users.

The server application 310 accesses/updates data in the database 320 and controls the telephony provider 330 via its APIs. The server application also responds to callbacks from the telephony API provider, e.g., instructing what action to take when a user answers a call or sends an SMS to the system 100.

Users' phones 340 receive traditional telephone calls and SMS messages from the telephony API provider 330 (as instructed by the server application 310) and can also send SMS messages to the system 100.

In some embodiments, users can optionally install a smartphone application 350 to facilitate video calls and high-definition audio calls. In this case, the server application 310 orchestrates the smartphone application 350 and telephony API provider 330 to establish a video or high-definition audio call with each other. Note that the telephony API provider 330 can bridge users on traditional telephone calls 340 with users on video calls via the smartphone app 350.

Figure 4:
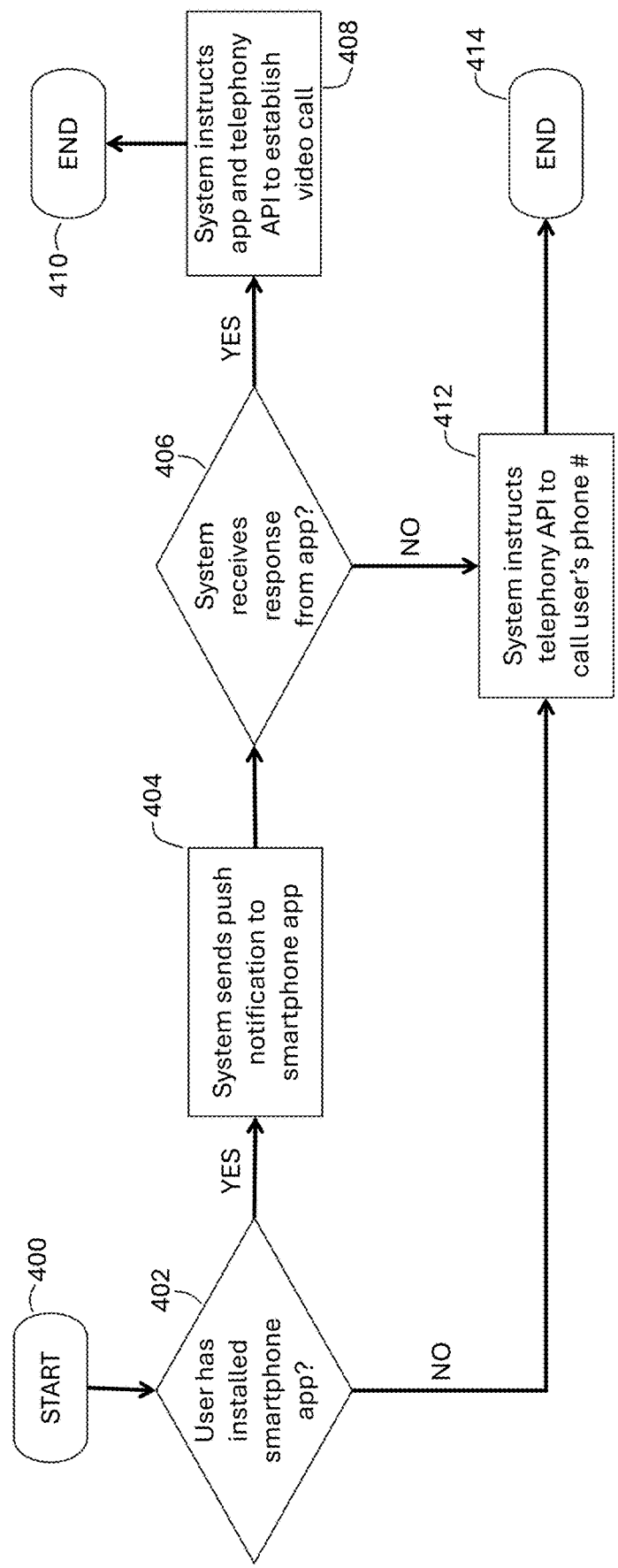
FIG. 4 shows how the system can facilitate video calls and fall back to traditional telephone calls.

FIG. 4 is a process diagram showing how the system provides video (or high-definition audio) calling functionality and falls back to traditional telephone calls when needed. The start of the process 400 occurs when the system intends to make an outbound call to a user. Decision point 402 is determined by the server application 310 querying the database 320 to see if the user has previously installed the smartphone application 350. If the user has not installed the smartphone application 350, process step 412 engages, wherein the server application 310 instructs the telephony API provider 330 to make a traditional telephone call to the user's phone number 340. This branch of the process ends at 414.

If at decision point 402, it is determined that the user has installed the smartphone application, process step 404 is engaged, wherein the server application 310 sends a push notification to the smartphone application 350 via the smartphone host platform (e.g., iOS or Android) APIs. The smartphone application 350, upon receiving the push notification, then sends an acknowledgement message to the server application 310, which then engages decision point 406.

At decision point 406, the server application 310 waits a specified amount of time for the acknowledgment message from the smartphone application 350. If no response is received in that timeout, which may occur, e.g., if the user's smartphone lacks a fully functional internet connection, then process step 412 is engaged, wherein the telephony API provider 330 is instructed to make a traditional telephone call to the user's phone number 340. If the server application 310 does receive an acknowledgement message from the smartphone application 350 within the specified timeout, then process step 408 is engaged.

During step 408, the server application 310 first instructs the smartphone application 350 to engage the appropriate host platform APIs (e.g., iOS CallKit or Android ConnectionService) causing the user's smartphone to ring and display a user interface for the user to answer the call from the system 100. Upon the user selecting in the user interface to answer the call, the smartphone application 350 and server application 310 then coordinate with the telephony API provider 330 to establish a video (or high-definition audio) call between the smartphone application 350 and telephony API provider 330. This remaining process branch then ends at 410.

FIGS. 5A, 5B, 5C, and 5D provide examples of how users interact with the system before and after the above-described calls. These interactions provide the system with data that the system uses to select which users are paired together for 1-on-1 conversations during the calls, with a goal of optimizing the quality of conversations and therefore users' feeling of social connectedness. The interactions can also encompass other activities between the system and users, e.g., coordinating when the system will call users or suggesting conversation topics.

The user interface for these interactions is implemented as text message communication between the system and users. If the user has installed the smartphone application 350, text messages from the system are displayed to the user within that smartphone application, where the user can also compose and respond with text messages back to the system. Absent the smartphone application, these text messages are implemented as SMS messages between the telephony API provider 330 and the user's phone number 340. Text messages from the user to the system are processed by the server application 310 using a Large Language Model (LLM) (e.g., OpenAI, Anthropic, LLama, etc.), which then calls functions within the server application 310 to take certain actions, e.g., updating the database 320. The LLM also calls functions to read from the database and then compose text messages that are sent to users.

Figures 5A, 5B:
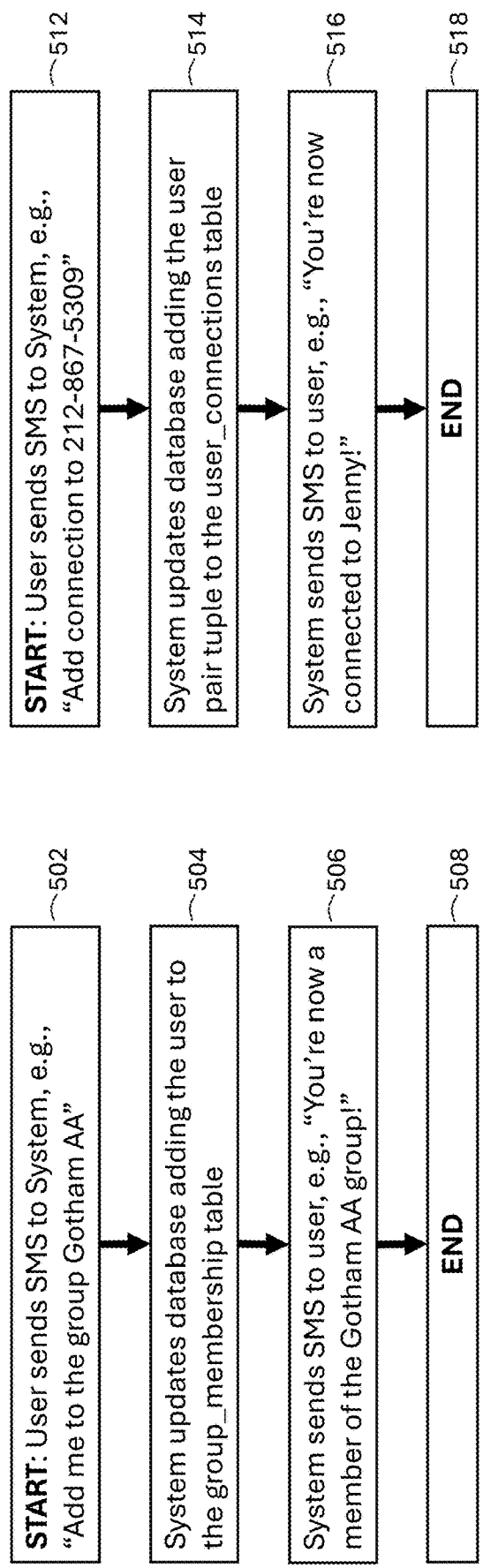
FIG. 5A shows how a user joins a group.
FIG. 5B shows how a user can add a connection to another user.

FIG. 5A is an example of how a user may join a group of other users so that the system may pair the user with other users from that group during calls. In this example, the user sends an SMS 502, "Add me to the group Gotham AA", to a phone number registered by the telephony API provider 330 on behalf of the system 100. The telephony API provider 330 then sends the contents of the user's text message to the server application 310, which processes the text message using the LLM. The LLM interprets the text message and then instructs the server application 310 to engage step 504, which updates the "group_membership" table in the database 320 with a "user-to-group" edge. The user then becomes a member of group "Gotham AA" in the social graph and may be paired with other members of the group during future calls. In the next step, 506, the server application uses the LLM to compose a confirmation message, "You're now a member of the Gotham AA group!", which is then sent via SMS from the telephony API provider 330 to the user's phone 340. The process stops at 508. Note that a user may effectuate this process multiple times if they choose to belong to multiple groups. Relationships between groups may also be indicated by "group-to-group" edges in the graph. Additionally, a user may scan a QR code, e.g., one that is provided at an in-person meeting of the group, that prepopulates the SMS 502 so that the user can join the group without manually entering the name of the group.

As shown in FIG. 5B, a user can also add an individual connection to another user. In this example, the user sends the system 100 an SMS 512, "Add connection to 212-867-5309." In the next step 514, the LLM interprets the message and then calls functions within the server application 310 to look up the other user by the specified phone number and to add a row for the pair of users to the "user_connections" table in the database 320. In the next step 516, the LLM composes an SMS, "You're now connected to Jenny", where "Jenny" in this example is the name of the user associated with that phone number in the database 320. The process stops at 518, after which these two users are directly connected in the social graph as "user-to-user" edge and therefore may be paired in future calls. Note if the specified phone number is not in the database, the system will send an SMS to that phone number inviting them to join the system. Additionally, the SMS 512 can be prepopulated by scanning a QR code. For example, if the two users want to connect while meeting in person, one user can use the smartphone app 350 to display a QR code for the other user to scan. In this case, the QR code may contain another identifier for the user, so that the two users can become connected in the social graph without revealing their phone numbers to each other.

Figures 5C, 5D:
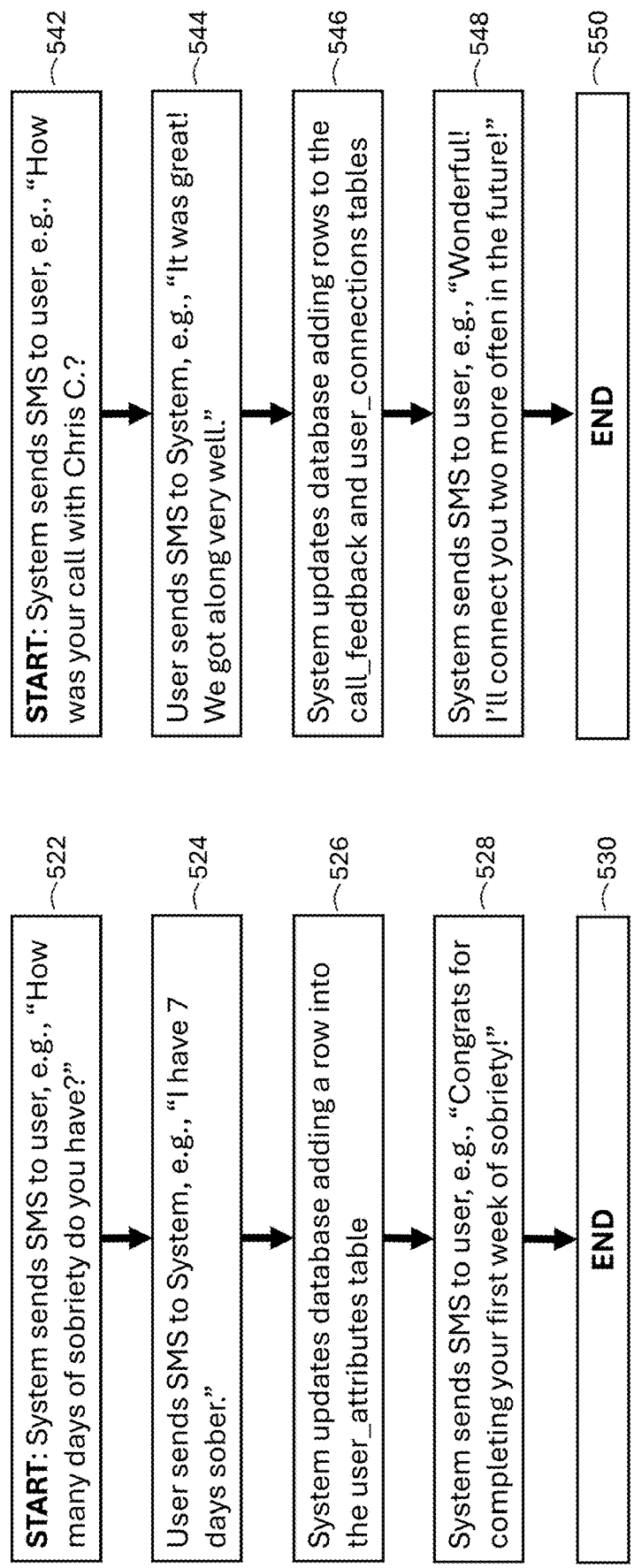
FIG. 5C shows how attributes about users can be added.
FIG. 5D shows how a user can provide feedback about their call with another user.

FIG. 5C is an example of how the system 100 can interact with users to discover and collect data attributes about the users. Such data attributes are also used by the system's heuristics to select pairs of users to connect during calls. In this example, the system 100 recognizes that the user is a member of the group "Gotham AA", which is an Alcoholics Anonymous group, so can ask the user sobriety-related questions to find out more about them. As such, in the starting step 522, the LLM composes the SMS message "How many days of sobriety do you have?", which is sent to the user. The user then responds by SMS 524, "I have 7 days sober." The LLM interprets the user's response and then calls a function initiating step 526 to add this data to the "user_attributes" table in the database 320. The LLM then composes an SMS 528, "Congrats for completing your first week of sobriety!", which is sent to the user to confirm that the user's response was understood. The process ends at 530. In this example, the system's heuristics would prefer pairing this user who is new to sobriety with another user who has long-term sobriety—i.e., preferring differences in attributes-because conversations where one person's experience is shared with a novice are known to be meaningful. In other examples, the heuristics may prefer to pair users with similarities in attributes. Moreover, whereas this example shows attributes being discovered explicitly by the system asking the user and the user responding to the system, in some embodiments, the system may infer user attributes by having the LLM process recorded conversations between users. Note that in jurisdictions where call recording requires consent, the system can first retrieve a "recording-consent" flag stored in the database and proceed with recording only if the flag indicates that consent has been granted.

FIG. 5D is an example of how, after a user has completed a call with another user, the system 100 may interact with that user to collect data about how the user liked their conversation with the other user. The goal here is to use this user feedback data to train the heuristics to make better pairings of users in the future. In this example, the LLM composes an SMS 542, "How was your call with Chris C.?", which is sent to the user. The user then responds to the system with SMS 544, "It was great! We got along very well." In the next step 546, the LLM interprets the user's message as indicating positive sentiment and then calls functions within the server application 310 to add rows to the "call_feedback" and "user_connections" tables with positive "affinity" weight. Then in step 548, the LLM composes an SMS, "Wonderful! I'll connect you two more often in the future." The process ends at 550. If, for example, the user states that they don't want to speak to the other user again, the system would record an infinite negative weight for the user tuple in the "user_connections" table. Note that whereas this example shows the system explicitly collecting the user's sentiment about the conversation by asking them for their feedback, some embodiments may infer the user's sentiment indirectly the duration of the call—i.e., longer calls indicate the users were well-engaged in conversation. Other embodiments may also deduce the user's sentiment by having the LLM process a recording of the conversation.

Figure 6:
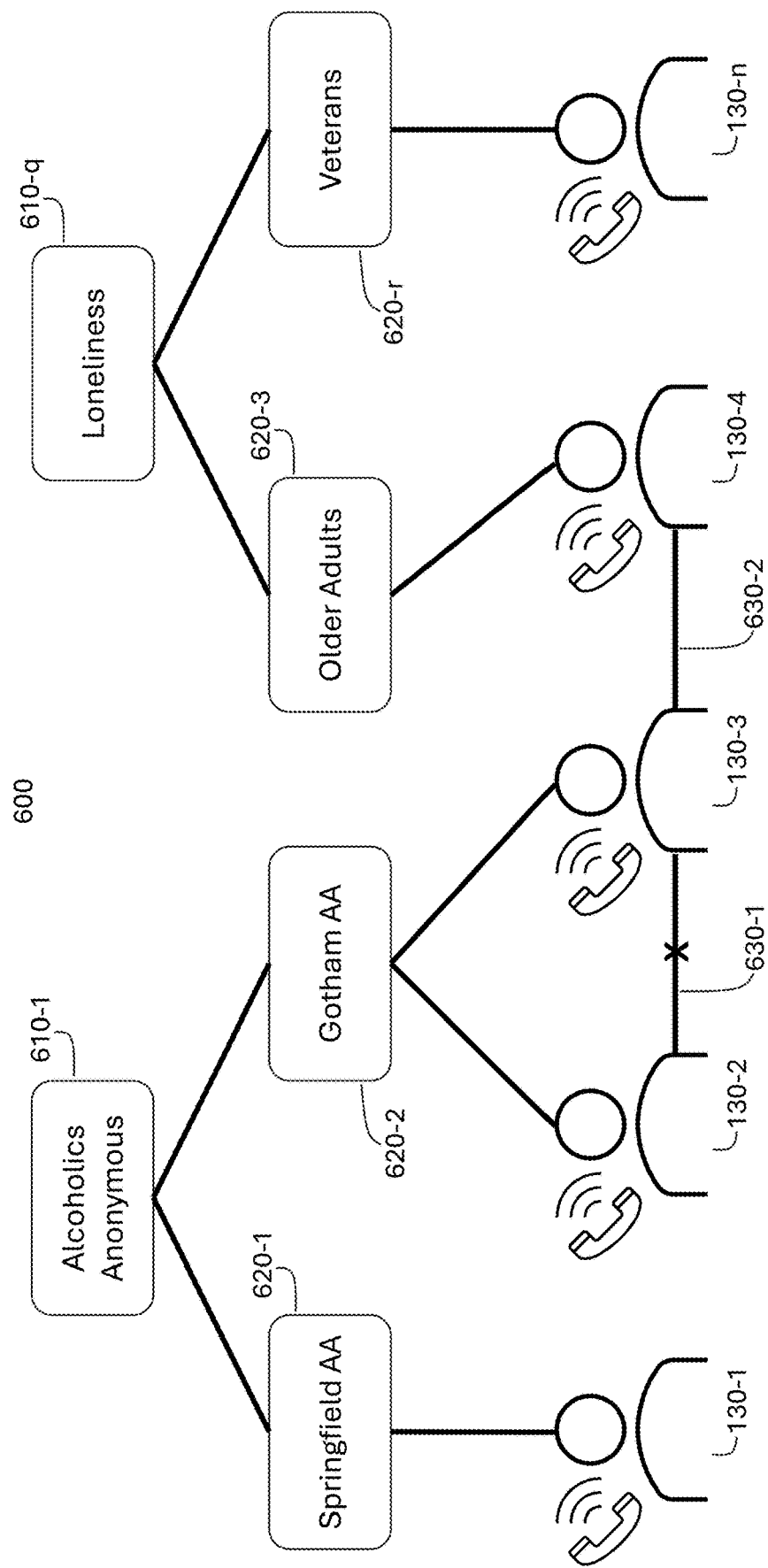
FIG. 6 is an example of a social graph.

FIG. 6 shows an example of a social graph, which encompasses group memberships and direct connections between users. In this example, social graph 600 contains two top-level parent groups: 610-1 for "Alcoholics Anonymous" and 610-q for "Loneliness". The parent group 610-1 includes two child groups: 620-1 for "Springfield AA" and 620-2 for "Gotham AA", representing local chapters of Alcoholics Anonymous. The parent group 610-q "Loneliness" contains two child groups: 620-3 for "Older Adults" and 620-r for "Veterans", representing groups formed around common characteristics. Users 130 are members of the various groups 620 and may belong to more than one group. Individual connection 630-1 links users 130-2 and 130-3 with an infinite negative weight, e.g., if one user provided feedback that they don't want to speak with the other user again. Individual connection 630-2 connects users 130-3 and 130-4 with a positive weight, e.g., if a user added a connection as per FIG. 5B.

Applying the example pairings from FIG. 2 to this example social graph 600, the system heuristics pairs user 130-1 with 130-2, and user 130-3 with 130-4. This is due to competing factors of group membership and individual connections. Normally, the heuristics prefer to pair users belonging to the same group, as in this example 130-2 and 130-3 both belonging to group 620-2. However, the infinite negative weight in the individual connection 630-1 between those users blocks them from being paired. Instead, the heuristics pair 130-1 with 130-2 because even though they belong to two different groups, the pairing is possible because those two different groups belong to the same parent group. The heuristics may have chosen this pairing spanning groups over other users in the same group due to attributes of those users, as per the example in FIG. 5C. Normally, the heuristics would not pair user 130-3 with 130-4 because they have no common group membership, not even through parent groups. However, the heuristics are able to pair them due to their individual direct connection 630-2.

Figure 7:
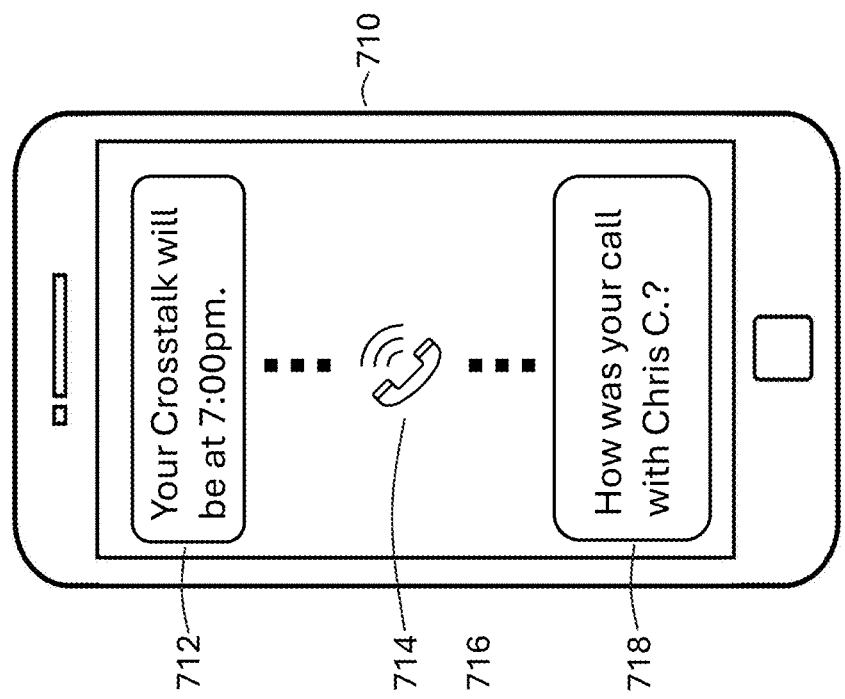
FIG. 7 is an example user interface on a smartphone.

After a user has joined one or more groups and/or added individual connections, that user will then be able to participate in 1-on-1 calls 220. FIG. 7 shows an example of how that proceeds from a user's perspective of a text message and call history user interface on their smartphone 710. In a first step 712, a user (say, user 130-1) receives an SMS from the system 100 notifying them at what time later in the day they will be called, e.g., "Your Crosstalk will be at 7:00 pm." Then in step 714 (occurring at 7:00 p.m.), the user 130-1 receives the automated outbound phone call 120-1 from the system 100. Assuming the user 130-1 answers that call 120-1, they will then in step 716 be connected to speak 1-on-1 as call 220-1 with another user (say user 130-2) due to their connection within the social graph 600. After the 1-on-1 call ends (e.g., one of the users hangs up), at step 718 the system 100 will send an SMS to the user 130-1 "How was your call with Chris C.?" as in step 542 of FIG. 5D.

Figure 8:
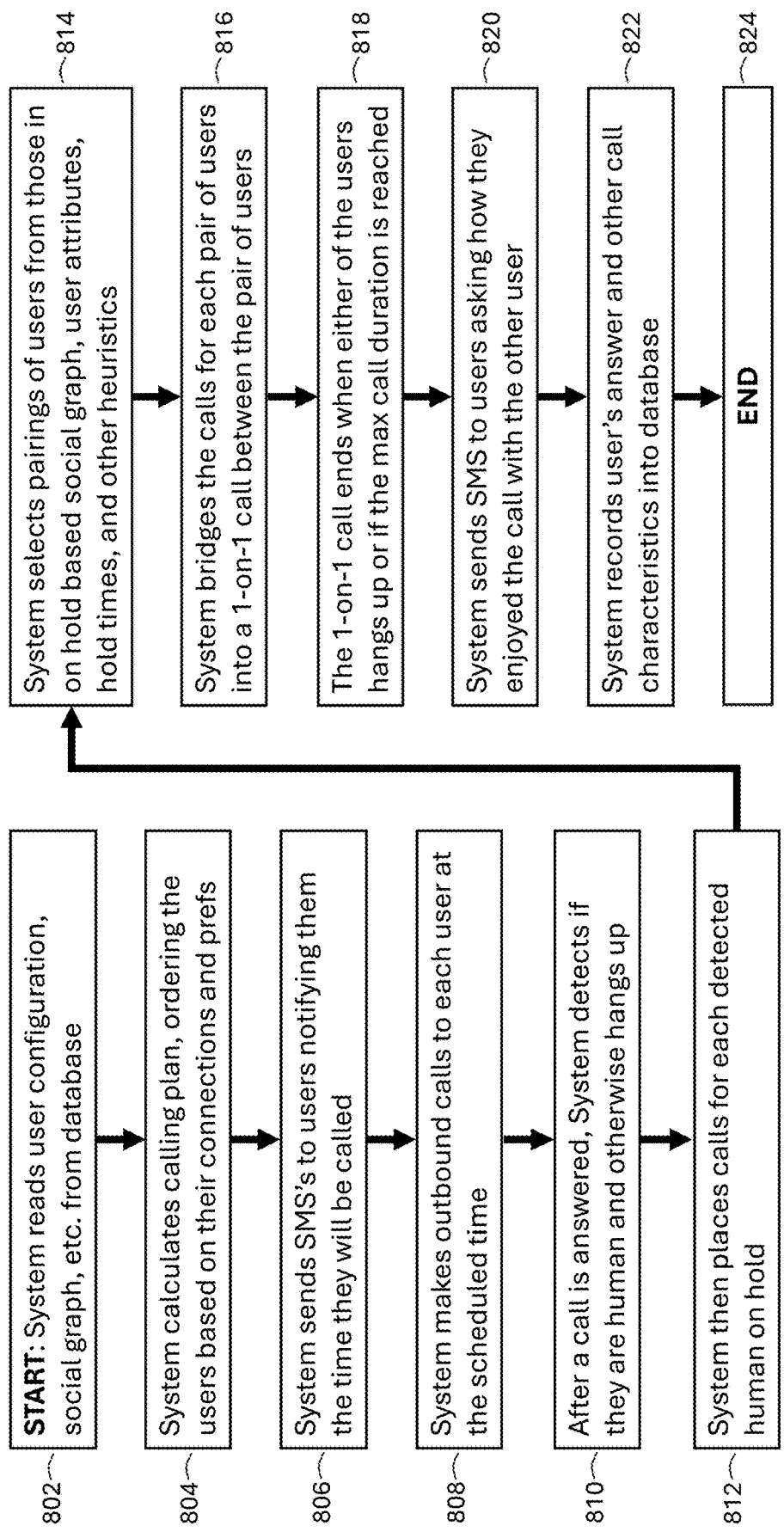
FIG. 8 is a functional flow diagram.

The functional flow diagram in FIG. 8 describes what happens behind the scenes, i.e., from the perspective of the server application 310.

First, at step 802, the server application 310 reads data from the database 320, e.g., the social graph 600, user attributes, preferences, call history, etc.

Next, at 804, the server application 310 calculates a call sequence plan—i.e., the time order in which the set of users 130 will be called-based on that data. The call sequence plan is needed because the telephony API provider 330 may have limits on the number of outbound calls that can be placed per second, causing delay between successive outbound calls.

Users that the system heuristics may select to pair together (e.g., those having connections in the social graph 600 or other factors) are preferably scheduled near each other in the calling sequence to minimize the time a user needs to wait on hold for the conversation partner to be called. From the discussions above, it should be understood that the pairings may depend on a number of factors, such as (i) users being members of one or more common groups in the social graph;

(ii) users being members of different groups that are connected by a common parent group in the social graph;

(iii) the affinity weight of an edge directly connecting two users in the social graph;

(iv) similarities or differences in users' stored preferences and data attributes;

(v) the current time on hold if the user has already answered the outbound call and, if not, the expected time until the user is called and may answer;

(vi) the historical times that the two users were paired in prior calls; and/or (vii) the historical sentiment of the users about those prior calls.

The pairing heuristics may be further improved by machine learning model training on historical data.

Once the call sequence plan is calculated, at 806, the server application 310 requests the API telephony provider 330 to send SMS messages to the users 130 notifying them of the time at which they will be called, e.g., "Your Crosstalk will be at 7:00 pm."

At 808, this results in the telephony API provider 330 actually making the outbound calls 120 to users 130 at the scheduled time calculated in the call sequence plan.

Figure 9:
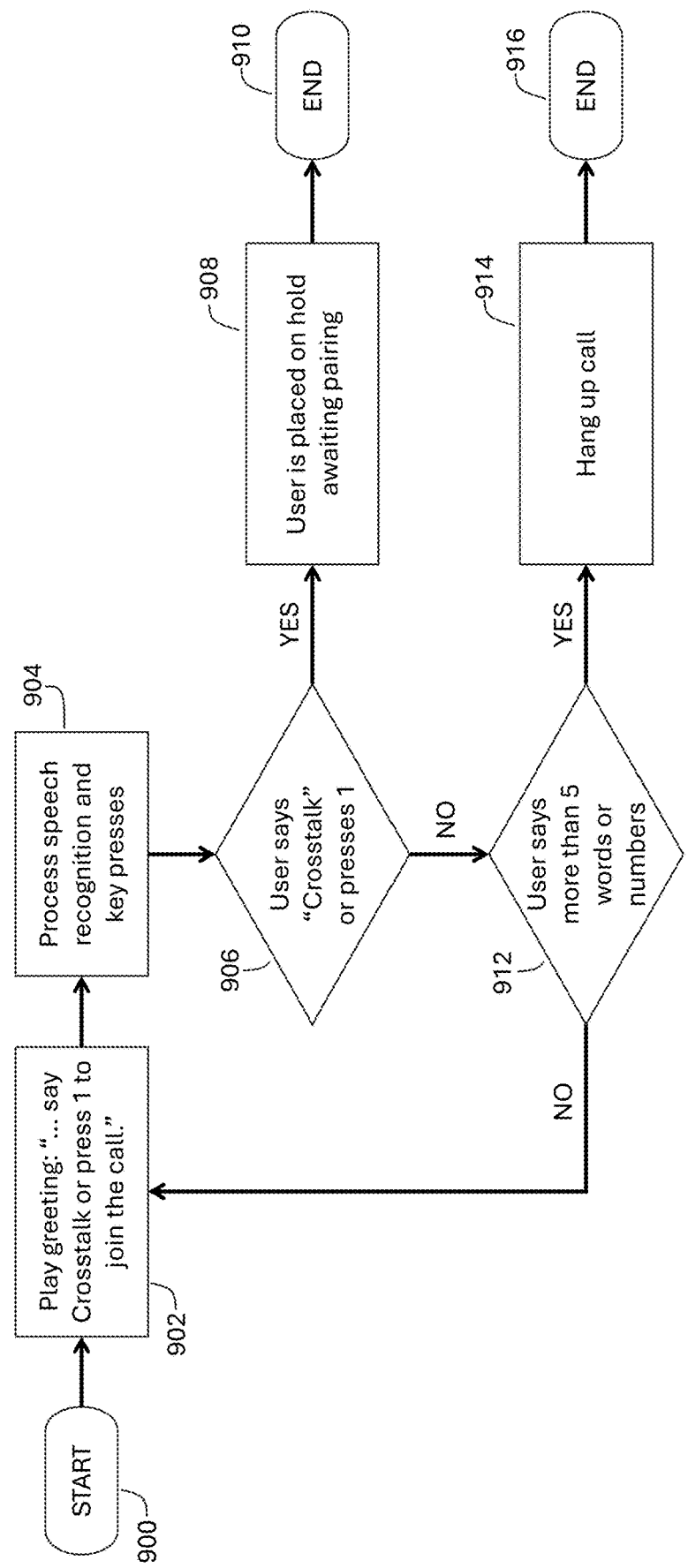
FIG. 9 shows a process to ensure participants are human as opposed to a user's voicemail.

At 810, when a given outbound call is answered, the telephony API provider 330 makes a callback to the server application 310 to begin a process 900 described in FIG. 9 that detects if the call is answered by a human intending to use the service. If not, the call was likely answered by the user's voicemail, and in such case, the system hangs as quickly as possible to prevent leaving a voicemail to the user.

Then at step 812, the system 100 instructs the telephony provider 330 to place the answered outbound calls for each detected human on hold.

Next at step 814, the server application 310 selects pairs of users from the set of users who are on hold. The heuristics for this pair selection are based on the same heuristics (such as the social graph) used for the call sequence planning, adding additional heuristics incorporating how long a user has been waiting on hold. This ensures that a user doesn't wait on hold an inconvenient amount of time for a marginally better conversation partner.

Then, at step 816, the server application 310 instructs the telephony API provider 330 to bridge the calls for each selected pair of users to establish a 1-on-1 call between the pair of users. This may be implemented in some embodiments by placing each pair of calls in their own conference room.

If there are an odd number of users who answered the outbound calls, the last user may be bridged into a call with two other users who have already been paired, thereby creating a 3-way call between the three users. Additionally, if a user on hold is determined to be a lone user, i.e., all the other users 130 who could answer the outbound calls 120 are not connected to this user in the social graph 600, then the system 100 will terminate the call with that lone user after stating an error message. In some embodiments, rather than hanging up on the lone user, outbound calls may be made to additional users, e.g., those who are able to be paired with anyone, so that the lone user guaranteed to be able to speak with someone.

At step 818, a 1-on-1 call ends when either user hangs up, a maximum call duration is reached, or the call is otherwise disconnected unexpectedly.

At step 820, after each 1-on-1 call ends, the system 100 will send an SMS to the users who were placed into 1-on-1 calls asking how they liked the call with the other user, e.g., "How was your call with Chris C." as in step 542 of FIG. 5D.

At step 822, the system 100 records each user's feedback response into the database, along with other call characteristics, e.g., call duration, and in some embodiments a recording of the conversation.

The process ends at 824 and may repeat starting at 802 at a later time.

FIG. 9 is a process flow diagram that describes step 810 in more detail. The objective for this process 900 is to ensure that the outbound calls 120 are answered by humans intending to use the system prior to pairing those calls with other users. It would otherwise be quite undesirable for the other user to be paired into a 1-on-1 conversation with someone's voicemail, or for the user to hang up quickly because they didn't have time to talk.

This process 900 only applies to traditional telephone calls 120 that the telephony API provider 330 makes to users' phones 340. It is not necessary to apply process 900 to calls made through the smartphone application 350, because such calls would not be routed to the user's voicemail. Additionally, the user interface would display the call as coming from the system 100, so the user will only answer if they are intending to use the system.

This process 900 starts when an outbound call is answered, and the telephony API provider 330 issues a callback to the server application 310 awaiting further instructions.

At the next step, 902, the server application 310 instructs the telephony API provider 330 to play a greeting, e.g., "Hello! It's time for Crosstalk. Say Crosstalk or press 1 to join the call."

At step 904, the telephony API provider 330 then processes speech recognition ("speech-to-text") and key presses from the call, sending that data in real-time to a callback of the server application 310.

Decision point 906 determines whether the user said the requested keyword, e.g., "Crosstalk", or presses the requested key, e.g., "1". If they did so, then the system infers this to mean the call was answered by a human intending to use the system, and the process proceeds to step 908, wherein the call is placed on hold waiting to be paired with another user (as in step 812 in FIG. 8). This branch of the process ends at 910.

If the user said a word or pressed a key other than that requested, then the process proceeds to decision point 912. Here, the server application 310 determines whether the user said more than a threshold number, e.g., 5, of words (including numbers) in a continuous pace of speaking. If that occurs, then the system infers this to mean that the call was answered by the user's voicemail and their voicemail greeting is playing. In that case, the process proceeds to step 914, wherein the server application 310 instructs the telephony API provider 330 to immediately disconnect the call. This is because waiting longer to hang up might otherwise leave a voicemail for the user, which would be inconvenient to clean up. This branch of the process ends at 916.

If at decision point 912, the system 100 determines the user has said 5 or fewer words in a continuous pace of speaking before pausing, then the process loops back to step 902—replaying the greeting message—to give the user another opportunity to say the requested keyword or press the requested key.

It is now understood how a system and method can make conducting periodic 1-on-1 calls between users in a social graph seamless and anxiety free. Instead of each user needing to dial another user manually to initiate a 1-on-1 call, the computer-controlled telephony system makes outbound calls to the users nearly simultaneously on a scheduled basis.

Then, shortly after users answer those outbound calls, the telephony system selects pairs of users who answered the calls and bridges the calls for each pair to establish a 1-on-1 call between the pair of users.

For example, the system 100 may create a plan to call 500 users from the social graph 600 at a specific time, e.g., 7 p.m., where the choice of which users and what time depends on the users' connections in the social graph and other attributes of the users. The system 100 will then send SMS messages to all 500 users to inform them that they will receive an outbound call from the system at the specified time, e.g., 7 p.m. Then at 7 p.m., the system 100 makes outbound calls to those 500 users simultaneously, or in rapid succession approaching simultaneously. If 400 users answer the calls, the system will then choose 200 pairings of those users and bridge the calls for each pair into a 1-on-1 call. If an odd number of people answer the calls, the last grouping will be a 3-way call.

The system 100 preferably selects the pairings of users based on the social graph 600 and other attributes, including a score, which may for example, depend upon when users were last paired with each other. For example, if two users were paired very recently, e.g., the day prior, the system may prefer not to pair these same users again during this call, instead promoting variety in the 1-on-1 conversations. On the other hand, if the two users were paired a while ago, e.g., a month prior, the system may prefer to pair these users again during this call to promote a sense of familiarity in a catch-up conversation.

Telephony API providers 330 typically cannot make truly simultaneous outbound calls because they are rate-limited to a certain number of outbound calls per second. As a result, the outbound calls 120 made by the system 100 may need to be initiated sequentially, though in rapid succession. For example, if the limit is 10 outbound calls per second, and the system needs to call 1,000 people, it will take 100 seconds to initiate all 1,000 calls.

A consequence of this is that the sequence of the outbound calls is important. For example, if the system intends to pair the first user called with the 1,000th user called, then the first user would need to wait on hold 100 seconds—an inconvenient amount of time—for their conversation partner to be called by the system. As a result, the system also chooses the sequence of people to call based on the intended pairings of those people, such that people likely to be paired are called proximally in the sequence.

The primary advantage of the system and method is that people no longer need to initiate dialing out to someone else to engage in a 1-on-1 call-a process that can be anxiety provoking and frustrating, considering the possibility their call goes unanswered. Instead, the users of the system only need to answer automated outbound calls from the system, and if they do answer, they are guaranteed to speak with someone.

Implementation Options

The foregoing description, along with the accompanying figures, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

It should be understood that the example embodiments described above may be implemented in many different ways. In some instances, the various "data processors" may each be implemented by a physical or virtual general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., one or more central processing units, disks, various memories, input/output ports, network ports, etc.) that enables the transfer of information between the elements. One or more central processor units are attached to the system bus and provide for the execution of computer instructions. Also attached to system bus are typically I/O device interfaces for connecting the disks, memories, and various input and output devices. Network interface(s) allow connections to various other devices attached to a network. One or more memories provide volatile and/or non-volatile storage for computer software instructions and data used to implement an embodiment. Disks or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

The invention claimed is:

1. A method for establishing one-to-one calls between a plurality of users in a social graph, the method comprising:
   a. confirming that two or more of the plurality of users opt in to participate in the one-to-one calls with other users in the social graph;
   b. determining one or more pairing heuristic scores for pairings of users in the social graph, each heuristic score representing an affinity to select that pair of users to be placed into a one-to-one call with each other, the pairing heuristic scores based on the social graph, including attributes of the users contained in the social graph;
   c. determining a timed calling sequence, the calling sequence defining a timed sequence of outbound calls to the plurality of users, the sequence being optimized such that pairings of users with high pairing heuristic scores are ordered temporally proximate to each other in the timed calling sequence,
   d. for each outbound call in the timed calling sequence;
   e. making a corresponding, outbound call to the associated user;
   f. determining if a human answered the corresponding outbound call;
      i. if a human answered the corresponding outbound call, placing that corresponding outbound call on hold;
      ii. if a human did not answer the corresponding outbound call, dropping that corresponding outbound call;
   g. until there are no more outbound calls on hold, and all outbound calls in the calling sequence have been made;
   h. selecting an optimal pair of users within the subset that remain on hold, the optimal pair based on the pairing heuristic scores and other attributes; and
   i. bridging the outbound calls associated with the optimal pair of users to establish selected one-to-one call between that pair of users.

2. The method of claim 1 wherein the social graph comprises one or more of:
   a. user-to-group edges representing user membership in one or more groups;
   b. group-to-group edges representing parent-child relationships between groups;
   c. user-to-user edges, representing direct connections between individual users; or
   d. attributes on nodes and edges.

3. The method of claim 1 wherein, prior to making the corresponding outbound call, communicating via text message or a user interface, comprising one or more of:
   a. receiving and processing requests from users to join groups or add individual connections to other users in the social graph;
   b. discovering and collecting data attributes about the users;
   c. discovering and collecting user preferences, including preferred times to receive the outbound calls; or
   d. sending notifications to each user indicating a time at which the respective user should expect to receive one of the corresponding outbound calls.

4. The method of claim 3 wherein a user's request to join a group within the social graph or add a connection to another user is automated by scanning a QR code.

5. The method of claim 1 wherein attributes and preferences of the users in the social graph are further identified by a Large Language Model processing recordings of prior calls.

6. The method of claim 1 wherein, after each user completes a one-to-one call with another user, determining a user's sentiment about that call, comprising one or more of:
   a. asking the user for their feedback about the call;
   b. inferring the user's sentiment about the call from a time duration of the call;
   c. deducing the user's sentiment about the call by processing a recording of the call with a Large Language Model; or
   d. incorporating a user's sentiment into an affinity weight attribute of an edge connecting the two users in the social graph.

7. The method of claim 1 wherein determining if a human answered the corresponding outbound call further comprises:
   a. determining if an outbound call is answered by a human who is still then intending to participate in a one-to-one call by requesting a user say a keyword or press a key; and b. determining if the outbound call is answered by a user's voicemail by using speech-to-text analysis and immediately disconnecting the call after a threshold number of words is recognized to prevent leaving a voicemail for the user.

8. The method of claim 1 wherein determining pairing heuristic scores for possible pairings of users further comprises:
   a. computing a pairing score for each possible pair of users, the pairing score being at least a function of one or more of:
      i. users being members of one or more common groups in the social graph;
      ii. users being members of different groups that are connected by a common parent group in the social graph;
      iii. an affinity weight of an edge directly connecting two users in the social graph;
      iv. similarities or differences in users' stored preferences and data attributes;
      v. a current time on hold if the user has already answered the outbound call and, if not, an expected time until the user is called and may answer;
      vi. historical times that the two users were paired in prior calls; or
      vii. historical sentiment of the users about those prior calls.

9. The method of claim 8 wherein the method for computing pairing scores is improved by machine learning model training on historical data.

10. The method of claim 1 further comprising, when a condition or preference is satisfied, identifying and bridging a size-N subset of more than a pair of calls.

11. The method of claim 1 wherein the outbound calls in the timed calling sequence are made in a time frame that is constrained by limitations on a number of calls per second imposed by a telephony provider used for making the outbound calls.

12. The method of claim 1 additionally comprising:
   while selecting optimal user pairs, modifying the calling sequence to call additional users if it is determined that an outbound call on hold would otherwise not be able to be bridged with another outbound call.

13. A method for making outbound calls to a plurality of users, a first subset of the users having a video or high-definition audio-capable application installed on an associated device and a second subset of users having an associated device with only traditional telephone call capability, or otherwise preferring telephone calls, the method preferring to make the call via the application and if necessary falling back to making a traditional telephone call, the method comprising:
   a. reading from a database a record that indicates whether a user has installed a video or high-definition audio-capable application on their associated device;
   b. when the record in the database for the given user indicates the application is installed:
      i. sending a silent background push notification to the application on the associated device;
      ii. waiting a predetermined timeout interval for an acknowledgement from the application; and
      iii. if the acknowledgement is received within the timeout interval, establishing, through the application, a media connection that supports at least one of video and high-definition audio;
   c. when the record in the database for the given user indicates that the application is not installed or the acknowledgment from the application is not received within the timeout interval, initiating an outbound traditional telephone call to the user's telephone number; and
   d. detecting whether the user answers the media-connection through the application on their device or the outbound traditional telephone call to the user's telephone number.

14. A system for establishing one-to-one calls between users represented as nodes in a social graph, the social graph including one or more of (i) edges linking users to groups, (ii) edges linking groups to parent groups, (iii) edges linking users to users, or (iv) attributes on nodes and edges, the system comprising:
   a. one or more data processors; and
   b. one or more computer readable media including instructions that, when executed by the one or more data processors, cause the one or more processors to perform a process for:
      i. receiving opt-in confirmations for users to register their desire to participate in the one-to-one calls with other users in the social graph;
      ii. determining one or more pairing heuristic scores for possible pairings of users in the social graph, each score representing the affinity to select that pair of users to be placed into a one-to-one call with each other, the scores based on the social graph, including attributes of the users contained in the social graph;
      iii. determining a calling sequence, the calling sequence defining a timed sequence of outbound calls to the plurality of users, the sequence being optimized such that users with high affinity pairing heuristic scores with each other are ordered temporally proximate to each other in the timed calling sequence;
      iv. accessing a telephony Application Programming Interface (API) to make corresponding outbound calls to the plurality of users according to the timed calling sequence;
      v. accessing a telephony API to determine if a human answered the corresponding outbound call,
      vi. for the remaining outbound calls on hold, until there are no more calls on hold and all outbound calls in the calling sequence have been made;
      vii. selecting optimal pairs of users within the subset that remain on hold, the optimal pairs based on the pairing heuristic scores and other attributes; and
      viii. accessing a telephony API to bridge each selected pair of outbound calls for those users to establish the selected one-to-one call between that pair of users.

15. The system of claim 14, wherein the instructions further cause the processors to perform a process for running a Large Language Model on call recordings to determine user attributes and user sentiment.

16. The system of claim 14, wherein the instructions further cause the processors to perform a process for running machine learning model training on historical data to improve the method of computing pairing heuristic scores.

17. The method of claim 1 additionally comprising:
   prior to making the corresponding outbound calls, notifying users to expect an outbound call at a specific time per the timed calling sequence; and
   executing the outbound call automatically at the specific time.

18. The system of claim 14 wherein the instructions further cause the processors to perform a process for accessing an API to interact with users, comprising one or more of:

a. receiving and processing requests from users to join groups or add individual connections to other users in the social graph;
b. discovering and collecting data attributes about the users;
c. discovering and collecting user preferences, including preferred times to receive the outbound calls; or
d. sending notifications to each user indicating a time at which the respective user should expect to receive one of the corresponding outbound calls.

19. The system of claim 14 wherein the instructions further cause the processors to perform a process for determining pairing heuristic scores for possible pairings of users further comprises:
   a. computing a pairing score for each possible pair of users, the pairing score being at least a function of one or more of:
      i. users being members of one or more common groups in the social graph;
      ii. users being members of different groups that are connected by a common parent group in the social graph;
      iii. an affinity weight of an edge directly connecting two users in the social graph;
      iv. similarities or differences in users' stored preferences and data attributes;
      v. a current time on hold if the user has already answered the outbound call and, if not, an expected time until the user is called and may answer;
      vi. historical times that the two users were paired in prior calls; or
      vii. historical sentiment of the users about those prior calls.

* * * * *